United States Patent [19]
Jones et al.

[11] Patent Number: 5,657,357
[45] Date of Patent: Aug. 12, 1997

[54] METHOD AND APPARATUS FOR PROVIDING DUPLICATE MESSAGES IN A RADIO COMMUNICATION SYSTEM

[76] Inventors: Thomas Mark Jones, 1610 Ottinger Rd., Roanoke, Tex. 76262; Eric Thomas Eaton, 3198 Medinah Cir. East, Lake Worth, Fla. 33467

[21] Appl. No.: 451,824

[22] Filed: May 26, 1995

[51] Int. Cl.$^6$ ............................................. H04B 7/10
[52] U.S. Cl. ............................................. 375/347
[58] Field of Search ...................... 375/267, 299, 375/347; 340/825.44; 370/79, 82, 95.1, 99, 95.3

[56] References Cited

U.S. PATENT DOCUMENTS 5,267,243  11/1993  Sarraf ........................ 370/95.1

*Primary Examiner*—Stephen Chin
*Assistant Examiner*—Kevin Kim
*Attorney, Agent, or Firm*—Kelly A. Gardner; John H. Moore

[57] ABSTRACT

A communication system (100) for providing duplicate messages includes a plurality of receivers for receiving a radio signal, the plurality of receivers including time diversity (110) and non-time diversity receivers (115). A message transmission device (105) within the communication system (100) transmits the radio signal. The radio signal includes a first frame of data, which includes first portions in which first information for reception by at least one time diversity receiver (110) is queued and second portions which are remaining after queuing of the first information. The second portions are queued with second information for reception by at least one non-time diversity receiver (115). The first portions are of a non-predetermined size that varies according to the amount of the first information.

27 Claims, 12 Drawing Sheets

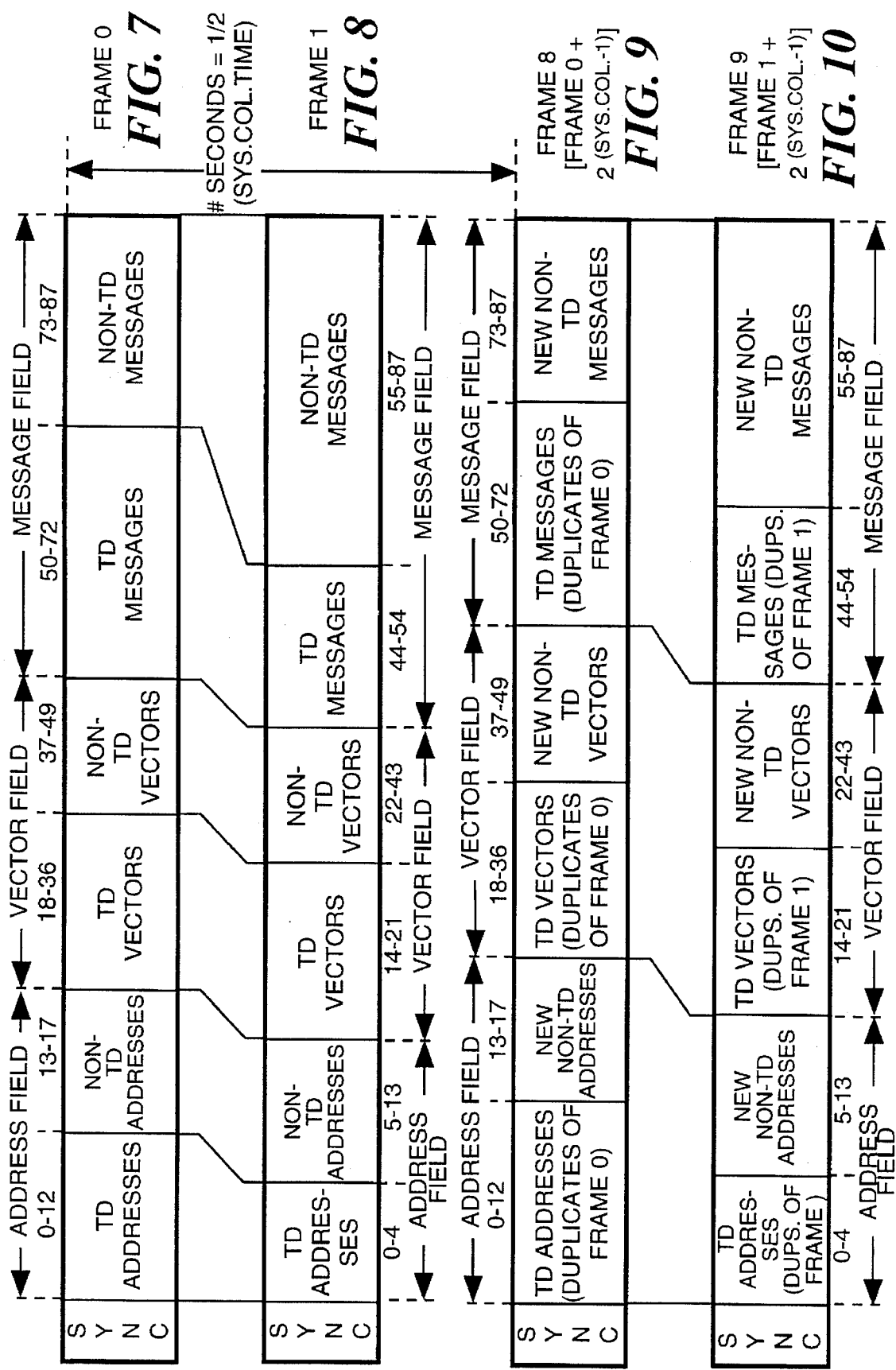

METHOD AND APPARATUS FOR PROVIDING DUPLICATE MESSAGES IN A RADIO COMMUNICATION SYSTEM

FIELD OF THE INVENTION

This invention relates in general to radio communication, and more specifically to a method and apparatus for providing duplicate messages in a radio communication system.

BACKGROUND OF THE INVENTION

Radio communication systems generally include a message transmission device, such as a base station, for encoding messages using a signalling protocol such as FLEX™. The encoded messages are then transmitted as a radio signal to portable devices, such as paging receivers or transceivers. To increase the probability that a pager receives an error-free message, some systems employ "time diversity", e.g., the transmission of duplicate messages.

Conventionally, different types of TD systems exist. Some TD systems involve the reception of duplicate messages by a pager, which then determines which of the received messages includes the fewest number of errors. The least erroneous message is stored and displayed to the user. Other systems provide for codeword combining, in which error-free codewords of messages and perhaps even addresses are selected from each of the duplicate transmissions then recombined to form a correct message in its entirety. Bit combination time diversity (BCTD) is the most accurate TD method. When BCTD is utilized, the pager receives duplicate transmissions and selects therefrom correct bits from each of the transmissions. The selected bits are then recombined to form a complete, error-free message. The drawback of BCTD is that each duplicate transmission must be located in a predetermined signal location so that the pager can calculate, such as from a fixed reference point, the exact locations of the bits of the duplicate transmissions.

In one BCTD system that employs the FLEX™ signalling protocol, the number of words in each frame is divided evenly according to the number of duplicate transmissions. In the conventional FLEX™ protocol the radio signal is divided into cycles of one-hundred-twenty-eight (128) frames, each including a predetermined synchronization pattern (sync) and a plurality of words. When the radio signal is to be transmitted at 1600 bits per second, for example, eighty-eight words are included in each FLEX™ frame. These eighty-eight words are usually divided into an address field, which includes addresses of pagers to which messages are being transmitted, a vector field following the address field, and a message field. Some addresses, such as those referring to numeric or alphanumeric messages, refer to a vector contained in the vector field, which specifies an area within the message field wherein a corresponding message is located.

In a BCTD system, when a message is to be transmitted two times, for instance, each frame is divided into two segments of forty-four words that follow the sync pattern. New message information is provided in the first forty-four word segment of each frame, while duplicate information from the preceding frame is always transmitted in the second forty-four word segment of each frame, as depicted in the signal diagrams of FIGS. 1 and 2. In FIG. 1, new information is provided in the first forty-four words of frame x. FIG. 2 illustrates the following frame, i.e., frame x+1, in which new information is provided in the first forty-four words and duplicate information of that provided in frame x is transmitted in the second forty-four words. Pagers that receive duplicate messages are able to exactly determine the location of each bit of a duplicate message because the duplicate messages are always provided in the same order within a second forty-four word segment of the subsequent frame. Therefore, a pager can select correct bits from both the new information, which is included in a first frame, and the duplicate information, which is included in a second frame, then recombine the bits to form an entire correct message.

However, this approach to TD results in a 50% decrease in capacity because a predetermined half of each frame is always dedicated to the transmission of duplicate information. When two or more repeat messages are transmitted, the situation worsens. For example, when four transmissions of each message are provided, each frame is divided into four even segments. New information is transmitted within the first segment of each frame, while the remaining three segments are dedicated to the transmission of duplicate information. Therefore, such a system results in a 75% decrease in capacity from a non-TD FLEX™ system.

A further problem is that, in the described BCTD system, only pre-programmed pagers can receive the duplicate messages. As mentioned above, FLEX™ conventionally includes an address field followed sequentially by vector and message fields for each frame. In the prior art BCTD system, though, the address, vector, and message fields associated with duplicate transmissions are positioned within the inner regions of the frame separate from fields associated with original transmissions. Only pre-programmed pagers therefore know to look in the middle of the frames for the duplicate transmissions. Other pagers, such as those that may roam into the system, will miss the duplicate transmissions because the roaming pagers only expect to find, for each frame, a single address field followed by one vector field and one message field.

The conventional prior art BCTD system is further problematic in that the limited number of words dedicated to original transmissions can result in the delayed transmission of lengthy messages or the fragmentation of lengthy messages into smaller portions for transmission. In either situation, the subscriber must wait a longer time than usual for message reception because his pager is waiting for the entire transmission of the message or for a later-transmitted portion of the long message. As a result, subscribers can be inconvenienced by the delay of message reception.

In FLEX™, messages transmitted to each pager are generally sequentially numbered so that, when a message is missed, the pager subscriber can call into the base station and request the re-transmission of the message that was missed. In the prior art BCTD system, though, the pager can receive a new message before a message having a previous number has been correctly "built." For example, the pager could erroneously receive a first transmission of message 1, correctly receive a first transmission of message 2, then receive the duplicate transmission of message 1. In this case, the pager would conclude that message 1 had been missed because message 2 was received first. Therefore, the prior art BCTD system can cause pagers to erroneously determine that messages have been missed.

Thus, what is needed is a method and apparatus for sending duplicate transmissions without decreasing system capacity by a predetermined, fixed amount and without significantly decreasing battery life. Furthermore, the method and apparatus should provide for reception of duplicate transmissions by roaming pagers. The method and apparatus should also provide for the transmission of duplicate messages without unreasonable delay and should not result in missed messages when the system operates on a "numbered messaging" scheme.

SUMMARY OF THE INVENTION

A radio communication system includes a message transmission device for sending a radio signal including duplicate messages and receivers for receiving the radio signal. The receivers comprise time diversity receivers for receiving the duplicate information and non-time diversity receivers. A method in the communication system for providing the duplicate messages includes the steps of receiving first information for transmission to at least one time diversity receiver and batching a first frame of data for transmission in the radio signal. The first information for transmission to the at least one time diversity receiver is queued into a portion of the first frame having a non-predetermined size that varies according to the amount of the first information to be transmitted to the at least one time diversity receiver during the first frame. Portions of the first frame remaining after queuing of the first information are queued with second information for transmission to at least one non-time diversity receiver.

A message transmission device for transmitting a radio signal includes a device for receiving first information for transmission to at least one time diversity receiver and batching circuitry for batching a first frame of data for transmission in the radio signal. The first information for transmission to the at least one time diversity receiver is queued into a portion of the first frame having a non-predetermined size that varies according to the amount of the first information to be transmitted to the at least one time diversity receiver during the first frame. Portions of the first frame remaining after queuing of the first information are queued with second information for transmission to at least one non-time diversity receiver.

A communication system for providing duplicate messages includes a plurality of receivers for receiving a radio signal, the plurality of receivers comprising time diversity and non-time diversity receivers. A message transmission device within the communication system transmits the radio signal. The radio signal includes a first frame of data, which includes first portions in which first information for reception by at least one time diversity receiver is queued and second portions which are remaining after queuing of the first information. The second portions are queued with second information for reception by at least one non-time diversity receiver. The first portions are of a non-predetermined size that varies according to the amount of the first information.

BRIEF DESCRIPTION OF THE DRAWINGS

FIGS. 7–10 are signal diagrams depicting fields included in the frames of FIG. 5 in accordance with the present invention.

DESCRIPTION OF A PREFERRED EMBODIMENT

Figure 3:
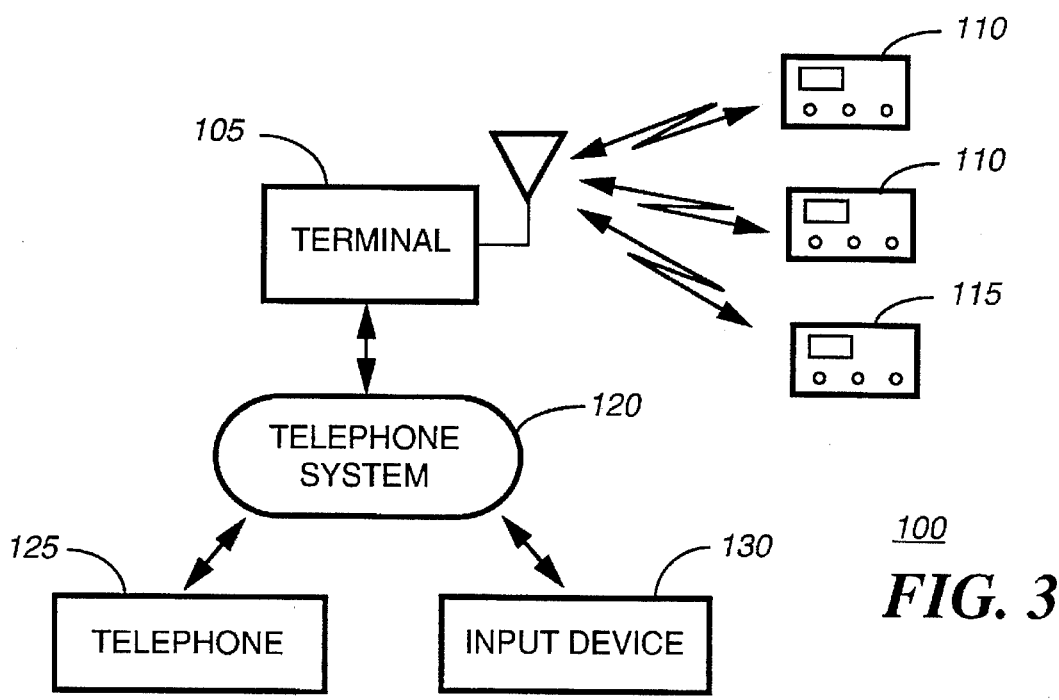
FIG. 3 is a block diagram of a communication system for transmitting duplicate information in accordance with the present invention.

FIG. 3 is a block diagram of a communication system 100 including a terminal 105 for transmitting messages to both time diversity (TD) receiving devices 110, such as pagers or paging transceivers, and non-TD receiving devices 115. The terminal 105 can be coupled to a telephone system 120 for receiving the messages thereover. Messages are generally provided to the telephone network 120 by conventional telephones 125 or other input devices 130, and information, such as addresses, by which destination pagers can be identified usually accompanies the messages. Messages to non-TD pagers are transmitted only once by the terminal 105, while messages intended for reception by TD pagers are transmitted more than one time. For example purposes only, the following description describes a communication system 100 in which messages intended for reception by TD receiving devices 110, e.g., pagers, are transmitted two times. It will be appreciated, however, that duplicate messages may be transmitted more than a single time in other embodiments of the present invention.

Preferably, the terminal 105 transmits information over the air using a conventional signalling protocol such as FLEX™. As mentioned briefly in the above Background of the Invention, conventional FLEX™ protocol involves the division of a transmitted radio signal into cycles of one-hundred-twenty-eight (128) frames, each including a predetermined synchronization pattern (sync) and a plurality of words. When the radio signal is to be transmitted at 1600 bits per second, for example, eighty-eight words are included in each FLEX™ frame. These eighty-eight words are usually divided into an address field, which includes addresses of pagers to which messages are being transmitted, a vector field following the address field, and a message field. Some addresses, such as those referring to numeric or alphanumeric messages, refer to a vector contained in the vector field, which specifies an area within the message field wherein a corresponding message is located.

In conventional FLEX™ systems, pagers are assigned a "home frame" in which messages can be received. A pager generally receives its messages in the home frame or at recurring intervals, the time of which is determined by a pre-programmed pager variable and/or a system variable, transmitted in each frame. These variables, commonly referred to as either a system collapse or a pager collapse, are in the form of an integer, and, in conventional FLEX™ systems, the pager wakes up from conventional battery saving to receive messages in frames given by the formula:

Receive Frames=Home Frame+$n2^{sc}$, where n=0, 1, 2, 3, . . . , where sc denotes the system collapse, and where the Receive Frames and the Home Frames will be represented by frame numbers. In other words, if the collapse used by the pager equals four (4) and the pager is assigned to a home frame of one (1), then the pager will wake up to receive messages in the first frame, which is the home frame and which is given by the above formula when n is zero (0). When n is one (1), the pager will wake up in the seventeenth frame, and so on. In this manner, the pager will periodically wake up every sixteen frames to receive messages.

In conventional FLEX™ systems, the system collapse varies according to the traffic in the system. When the system is crowded, the system collapse can be decreased to clear messages from a terminal more rapidly. Once the messages have been transmitted, the system collapse can then be increased again. A pager can normally utilize its pre-programmed collapse, rather than the system collapse, for receiving messages. When the system collapse falls below the pager collapse, though, the pager employs the system collapse instead. For simplicity, pagers included in the communication system 100 according to the present invention are described as using only the system collapse. It will be appreciated, however, that the frames in which the messages are transmitted to a pager will vary when the pager switches between system collapse and pager collapse.

For example purposes only, the system collapse for the communication system 100 is described as being four, i.e., system collapse=4. In alternative embodiments of the present invention, though, the system collapse could be set to various other integer values. The system collapse used by the pager is related to an amount of time, i.e., the system collapse time, in which a particular number of frames is transmitted. The number of frames transmitted in the system collapse time is given by the formula:

no. of frames=$2^{sc}$.

Therefore, when the system collapse equals four, sixteen framers are transmitted in the system collapse time.

In the prior art time diversity system described briefly in the Background of the Invention, all pagers must utilize the system collapse. Therefore, all pagers, both TD and non-TD, must wake up as designated by the system. In the communication system 100 according to the present invention, on the other hand, non-TD pagers can normally operate on pre-programmed pager collapses, rather than the system collapse. As a result, the battery life of non-TD pagers in the communication system 100 can be significantly increased over the battery life of non-TD pagers in the prior art system.

Figure 4:
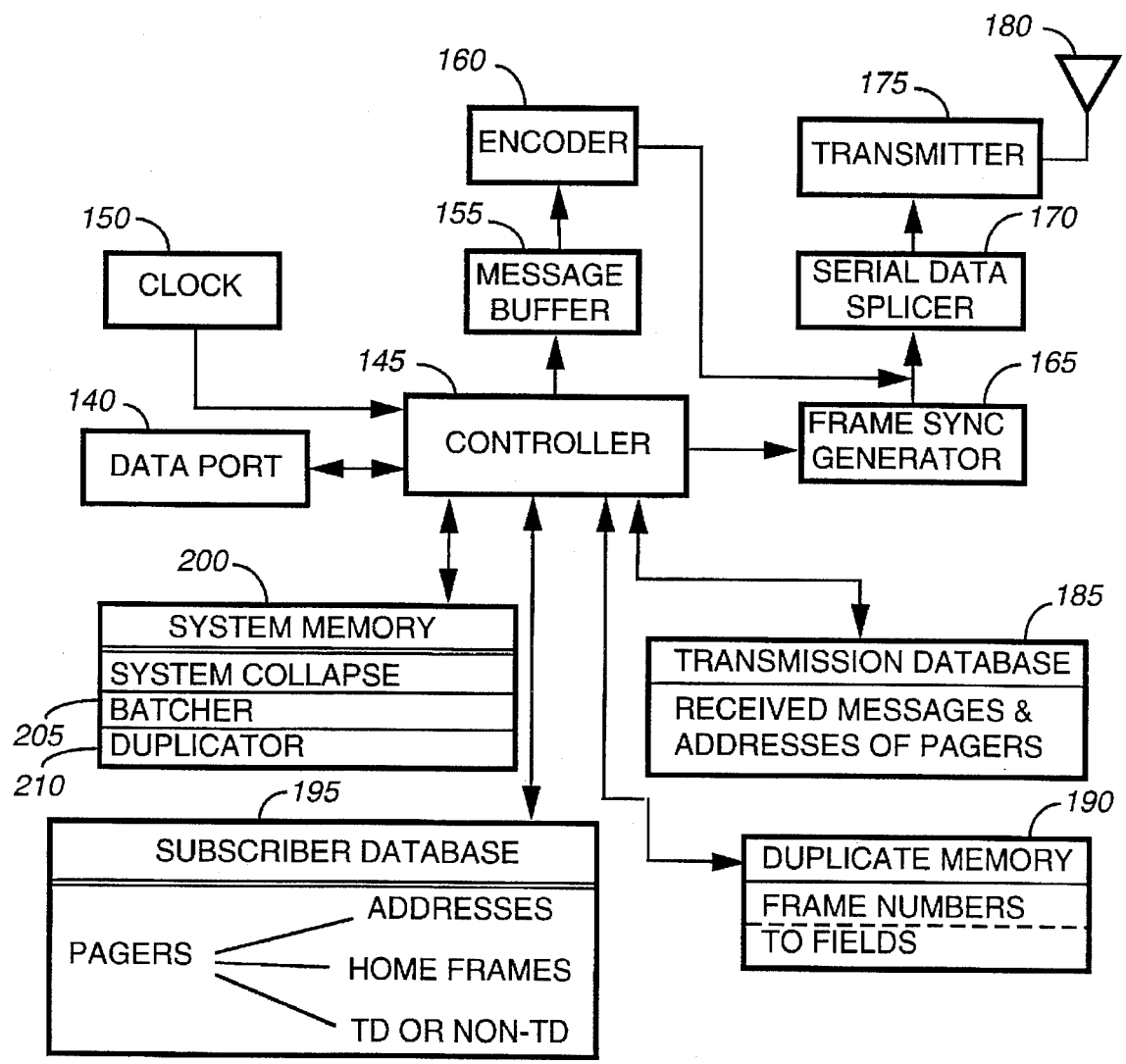
FIG. 4 is an electrical block diagram of a terminal included in the communication system of FIG. 3 in accordance with the present invention.

Referring next to FIG. 4, an electrical block diagram of the terminal 105 is shown. The terminal 105 includes a data port 140 for receiving messages and information for identifying recipient pagers. Alternatively, the terminal 105 could include a modem, data entry device, or any other circuitry instead of or in addition to the data port 140. A controller 145 controls the operation of the terminal 105 and receives information from the data port 140. The terminal 105 further includes a clock 150 for providing time values and a subscriber database 195 for storing information about system subscribers. Such stored information can, for instance, comprise a listing of all pagers subscribing to the system, an address corresponding to each pager, and an indication of whether each pager is a TD pager, e.g., one that receives at least one duplicate message, or a non-TD pager, e.g., one that receives only a single transmission of each message. Additionally, according to the present invention, the subscriber database 195 stores the home frame to which each pager is assigned.

The terminal 105 further comprises a transmission database 185 for storing received messages and addresses of pagers to which the messages are to be transmitted. A duplicate memory 190 stores information transmitted to TD pagers and frame numbers associated with frames in which the information was transmitted. Also, a system memory 200 is coupled to the controller 145 for storing a conventional system collapse variable corresponding to an amount of time during which a pager can "sleep" to conserve battery life.

A batcher 205 is included in the terminal 105 for gathering from the transmission database 185 addresses of and messages for TD pagers. Duplicate information intended for TD pagers is provided by a duplicator 210 to the controller 145 for transmission during certain frames. The batcher 205 and the duplicator 210 can comprise firmware that is stored in the system memory 200 for execution by the controller 145 during the operation of the terminal 105. Alternatively, the batcher 205 and the duplicator 210 can be implemented using hardware capable of performing equivalent operations.

Preferably, the controller 145 gathers information to be transmitted during each frame into address, vector, and message fields according to the FLEX™ protocol. The information is then coupled to a message buffer 155 for temporarily storing the information until a time for further processing and transmission. Frames are transmitted in numeric sequence, so that while a current frame is being transmitted, the next frame to be transmitted is in the message buffer 155, and the next frame thereafter is being gathered by the controller 145. At the appropriate time, the information stored in the message buffer 155 is transferred to the encoder 160 for encoding the information into a conventional signalling format such as FLEX™.

The controller 145 next enables a frame sync generator 165, which generates the predetermined synchronization (sync) pattern that is transmitted at the start of each frame transmission. The sync pattern is multiplexed with the encoded information by the serial data splicer 170, which generates a message stream. The message stream is transmitted by a transmitter 175 over an antenna 180 for reception by pagers in the communication system 100.

According to a preferred embodiment of the present invention, the terminal 105 transmits original and duplicate messages to TD pagers in different frames. However, predetermined portions of the frames are not allocated in advance for transmission of the original messages. Instead, as each frame is to be transmitted, only portions of the frame necessary to accommodate original transmissions to TD pagers are utilized. The other portions of the frame are then queued with information to be transmitted to non-TD pagers. In this manner, the automatic reduction in capacity that is present in prior art TD systems does not occur in the communication system 100 according to the present invention.

Preferably, TD pagers included in the communication system 100 utilize bit combination time diversity (BCTD) techniques to combine bits of original message and address information with bits of duplicate message and address information and thereby arrive at a correct message and address. Therefore, although the original transmissions do not require a predetermined, fixed allocation of portions of the frames in advance, it will be appreciated that each duplicate transmission should be the same number of words as the corresponding original transmission. It will be further appreciated that each bit included in the duplicate transmission should be transmitted in a location within its frame that is determined by the location in which a corresponding bit included in the original transmission was queued.

As mentioned above, the system collapse preferably equals four such that sixteen frames are transmitted in the system collapse time. In other words, pagers in the system 100 normally wake up in their home frames and every sixteen frames thereafter for message reception. However, TD pagers receive not only original transmissions, but also duplicate transmissions. It is preferable that message reception for TD pagers not be delayed for greater than the system collapse time, so, according to the present invention, TD pagers wake up more often than non-TD pagers.

Figure 5:
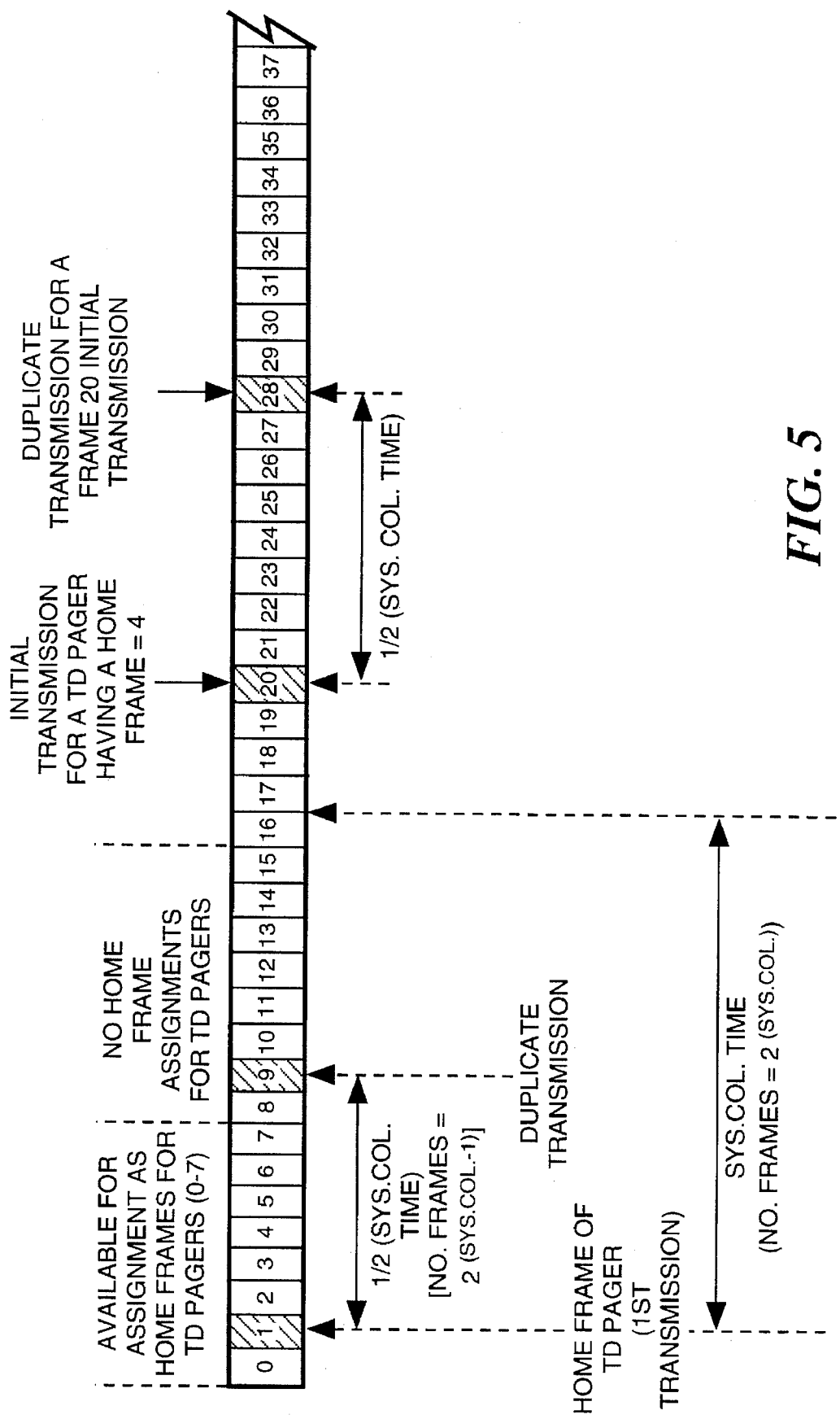
FIG. 5 is a signal diagram of a radio signal including a number of frames in which original and duplicate information is transmitted in accordance with the present invention.

The transmission of duplicate messages to TD pagers can be better understood by referring to FIG. 5, which is a signal diagram depicting the transmission of duplicate messages using the FLEX™ protocol. For example purposes only, half of the frames in the first system collapse time of each FLEX™ cycle are shown as home frames for assignment to TD pagers. As shown in FIG. 5, frames zero (0) through seven (7), for example, are assigned as home frames for both TD pagers and non-TD pagers because frames zero through seven comprise half of the frames transmitted during the first system collapse time in a FLEX™ cycle. Frames eight (8) through fifteen (15) are not, according to the present example, assigned as home frames for TD pagers. The described assignment of frames zero through seven as home frames, though, is chosen for example purposes only. It will be appreciated that TD pagers could alternatively be assigned frames eight (8) through fifteen (15), rather than frames zero through seven, as home frames.

In the present example, in which TD pager home frames include frames zero through seven, the terminal 105 transmits original messages to a TD pager during its home frame or any frame removed in time from the home frame by the system collapse time or a multiple thereof. The remaining frames transmitted during each system collapse time are used for the transmission of messages to non-TD pagers and, as necessary, for the transmission of duplicate messages to TD pagers. Therefore, TD pagers wake up every half system collapse time, i.e., twice as often as non-TD pagers, to receive duplicate messages.

For instance, when a TD pager is assigned a home frame of "one", it will wake up to receive original information in the first frame and every sixteen frames thereafter. Additionally, the TD pager will wake up a certain number of frames after the transmission of the original information to receive duplicate information. This certain number of frames is given by the formula:

$$\text{no. of frames} = 2^{(sc-1)}.$$

As shown in FIG. 5, the TD pager assigned a home frame of one wakes up in frame 1 to receive original messages, in frame 9 to receive duplicates of the frame 1 messages, in frame 17 to receive original messages, in frame 25 to receive duplicates of the frame 17 messages, and so on. In other words, after waking during the home frame, a TD pager wakes up in frames given by the equation $n2^{(sc-1)}$ to receive original and duplicate messages, where $n=1, 2, 3, \ldots$ In this manner, both TD pagers and non-TD pagers completely receive messages within the system collapse time.

This is especially advantageous in communication systems utilizing a message numbering scheme in which messages to each pager are sequentially numbered so that the subscriber can call in for missed messages. In such a system, the terminal 105 according to the present invention has transmitted all duplicate messages prior to transmission of another original message to any given pager. As a result, a TD pager has the opportunity to completely build an error-free message with a previous number before a message having the next number is transmitted. Unlike prior art BCTD systems, therefore, the pager does not erroneously conclude that a message has been missed when duplicates are still remaining to be transmitted.

Additionally, the transmission of all duplicates of a message within one system collapse time allows duplicate messages to be cleared out of the system very quickly, i.e., in one battery save cycle. Therefore, a system can switch to the transmission of a different protocol in a short time period. For instance, the communication system 100 can, within one battery save cycle of the pagers, transmit all of the duplicate TD information, then begin transmitting information formatted using the conventional FLEX™ protocol in which duplicate messages are not transmitted. Also, during the transmission of the duplicate TD information, new non-TD information can still be sent in available portions of the frame so that the channel is used efficiently.

In the prior art BCTD system, on the other hand, pagers operate on a conventional battery save cycle and therefore only awake for reception at times indicated by the system collapse value. A pager in the conventional BCTD system will not receive all of its duplicate messages until several battery save cycles elapse. During this time period, if the system is to switch transmission protocols, no new information can be provided. Instead, in frames in which duplicate messages are transmitted, the portions of the frames dedicated to the transmission of new information will remain empty to allow the system to clear out all of the TD information. In the conventional BCTD system, unlike the system 100 according to the present invention, this results in a relatively long period of time in which the paging channel is inefficiently utilized to transmit only duplicate information.

Although FIG. 5 depicts the assignment of a predetermined range of frames as home frames, in actuality any frame can be assigned as a home frame for a TD pager. In embodiments of the present invention in which the assignment of TD pagers to home frames is not predetermined, some frames will include duplicate information for TD pagers, original information for TD pagers, and also information for non-TD pagers, as will be described in greater detail below.

In summary, the following formulas assist in understanding the transmission of information to TD pagers in the communication system 100 according to the present invention.

(1) no. frames in $sc = 2^{sc}$,
(2) original frames = home frame + $n2^{sc}$,
(3) duplicate frames = home frame + $n2^{sc} + 2^{(sc-1)}$, and (4) awake frames=home frame+$n2^{(sc-1)}$, where n=0,1,2,3, . . . In formula (1), "no. frames in sc" denotes the number of frames transmitted during each system collapse time. "Original frames" describes frames in which original transmissions are provided to TD pagers, while "duplicate frames" describes frames in which duplicate transmissions are provided to TD pagers. "Awake frames" denotes all frames in which a TD pager wakes to receive both original and duplicate messages.

It will be appreciated that, in embodiments in which more than one duplicate message is transmitted to TD pagers, the formulas will change to accommodate the additional awake time of the pagers. For example, when messages are provided four times (three duplicates), duplicate and awake frames could be given by the following formulas:

$$\text{duplicate frames} = \text{home frame} + n2^{sc} + 2^{(sc-2)},$$

and $$\text{awake frames} = \text{home frame} + n2^{(sc-2)},$$

where n=0, 1, 2, 3, . . . These formulas are based upon a division of the frame into equal time periods, although the frame need not be divided equally. In general, the following formula could represent the awake frames for any number p of duplicate messages, i.e., message transmitted p+1 times:

$$\text{awake frames} = \text{home frame} + \{n2^{sc} - 2^{(sc-1)} - \ldots - 2^{(sc-p)}\},$$

where n=0, 1, 2, 3, . . . and where p=number of duplicate messages.

It will also be understood that duplicate information is not restricted to transmission before the system collapse time has expired. Instead, duplicate information can be transmitted in any frame, as long as the pager can determine where to locate the duplicate information.

Preferably, the terminal 105 provides, as a part of the sync pattern, information by which the pager can determine, in a manner well known to one of ordinary skill in the art, whether the system is a TD system, the number of repeats in the TD system, and the value of the system collapse. Alternatively, in a system in which the pager subscriber specifies the number of desired repeat messages, the terminal 105 need not transmit information indicative of a number of repeats in the system.

The pager is pre-programmed with information by which it can adjust its wake-up time in accordance with the system collapse and the number of repeated messages. For instance, the sync pattern could include information indicative of the variables sc, representing system collapse, and p, representing the number of duplicate messages, and the pager could be pre-programmed with the above formula utilizing the variables n and p so that the pager could quickly determine when to wake up from battery save mode to receive information.

Figure 6:
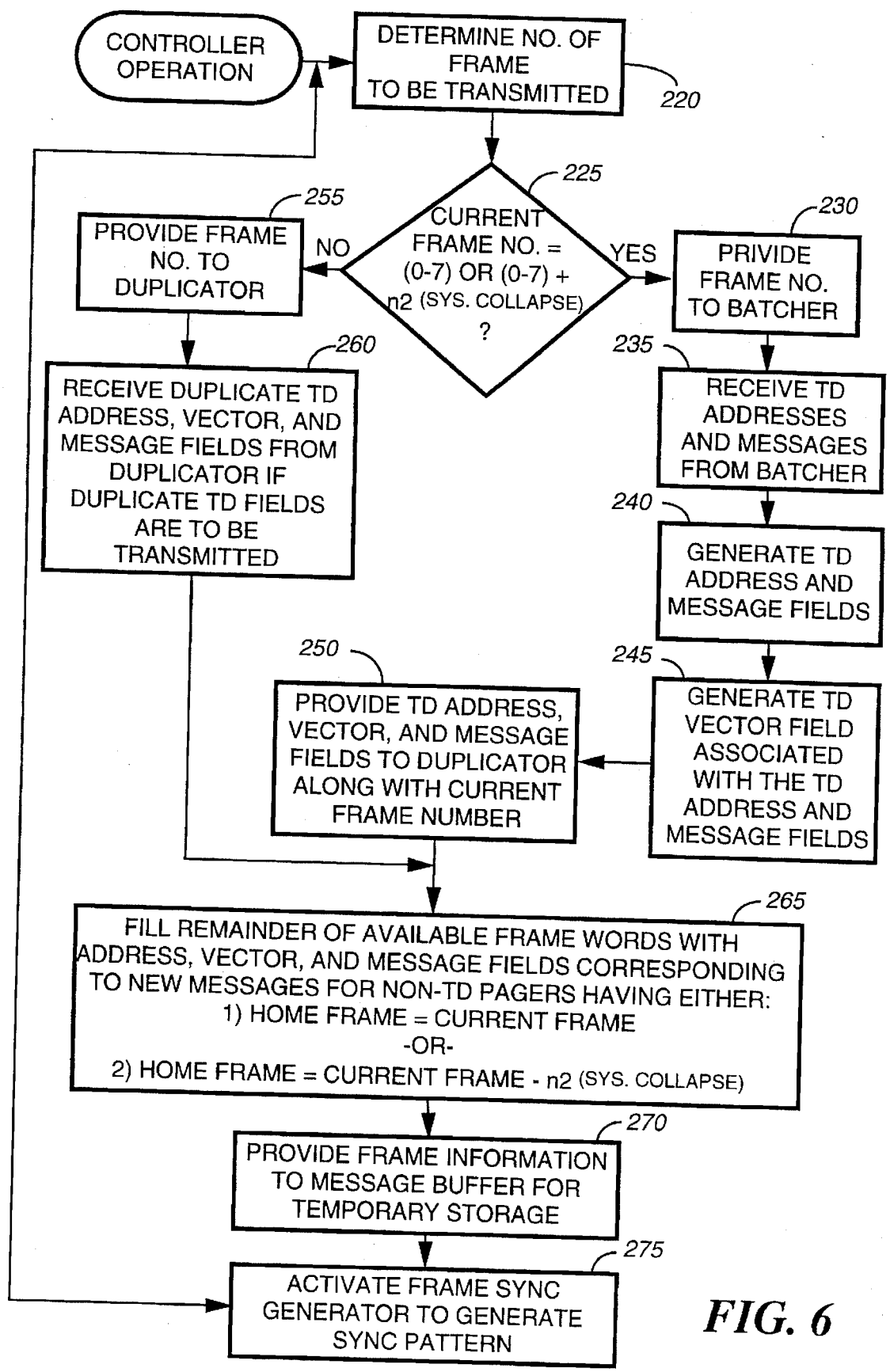
FIG. 6 is a flowchart illustrating an operation of a controller included in the terminal of FIG. 4 in accordance with the present invention.

Referring next to FIG. 6, a flowchart illustrates an operation of the controller 145 (FIG. 4) included in the terminal 105. At step 220, the controller 145 determines, by reference to the clock 150, the number of the current frame, i.e., the frame that is being prepared for transmission. Next, at step 225, the controller 145 determines whether the current frame comprises an original frame or a duplicate frame with respect to transmissions to TD pagers. Specifically, the controller 145 determines whether the current frame is equivalent to a TD pager home frame or to a frame removed from a TD pager home frame by the system collapse time or a multiple thereof. For example purposes, as mentioned above, the TD pager home frames include the first half (frames 0–7) of the frames transmitted in one system collapse time.

When, at step 225, the current frame is an original frame, the frame number is provided, at step 230, to the batcher 205 (FIG. 4). The controller 145 receives, at step 235, the messages to be transmitted to TD pagers during that frame and the addresses of the recipient TD pagers from the batcher 205. Thereafter, the controller 145 queues, at step 240, the TD addresses and messages into address and message fields. Additionally, at step 245, the controller 145 generates vectors for relating the TD pager addresses to the messages queued in the message fields and then queues the vectors into a TD vector field. The TD address, vector, and message fields are subsequently provided, at step 250, to the duplicator 210 for processing thereby.

When, at step 225, the current frame is a duplicate frame, the frame number is provided, at step 255, to the duplicator 210. Next, duplicate TD address, vector, and message fields are received, at step 260, from the duplicator 210 when duplicate information is to be transmitted during the current frame.

The controller 145 next determines the amount of available space left in the current frame after placement of the TD address, vector, and message fields in the current frame. Then, at step 265, the space still available in the frame is queued with address, vector, and message fields corresponding to new messages for non-TD pagers that wake during the current frame. Specifically, a non-TD pager can receive information in the current frame when, for the non-TD pager, the current frame is equivalent to the home frame or a frame removed from the home frame by a number of frames given by $n2^{sc}$, where n=1, 2, 3, . . . The frame information, i.e., the queued address, vector, and message fields for TD and non-TD pagers, is provided, at step 270, to the message buffer 155 (FIG. 4) for temporary storage, and the frame sync generator 165 is activated to generate the predetermined sync pattern, at step 275.

FIGS. 7–10 are signal diagrams depicting the information queued into frames by the controller 145 in accordance with the present invention. FIG. 7 depicts an example of the transmission of original information in frame 0. As shown, words 0–12 of frame 0 include TD addresses, and words 13–17 include non-TD addresses. Together, words 0–17 comprise an address field. A vector field including TD vectors followed by non-TD vectors is appended to the address field. Additionally, a message field follows the vector field. The message field preferably comprises TD messages at words 50–72 and non-TD messages at words 73–87. As can be seen from referencing FIG. 7, the TD addresses, vectors, and messages do not fill the entire frame. Instead, after gathering the TD addresses, vectors, and messages to be transmitted in frame 0, space was still available in frame 0. Therefore, non-TD addresses, vectors, and messages were queued into the remaining space of frame 0.

When the system collapse equals four, duplicate information is transmitted in frame 8 to the TD pagers that received original information in frame 1, as shown in FIG. 9. The duplicate information not only comprises the same information as that transmitted in frame 0, but is also located in equivalent locations within the frame. More specifically, the duplicate TD addresses of frame 8 are transmitted at words 0–12 of frame 8 because the original TD addresses were transmitted at words 0–12 of frame 0. This is also true for the duplicate TD vectors and messages. In this manner, a TD pager utilizing BCTD techniques can easily determine which bits of frame 8 correspond to the bits of frame 1.

FIGS. 8 and 10 are signal diagrams showing an example of the transmission of original information (FIG. 8) and duplicate information (FIG. 10) to TD pagers. In FIG. 8, original TD addresses are queued at words 0–4 of frame 1, TD vectors are queued at words 14–21, and TD messages are queued at words 44–54. The remaining words are utilized for the transmission of messages to non-TD pagers scheduled to wake in frame 1. FIG. 10 illustrates the transmission of duplicate TD information in locations of frame 9 that are equivalent to locations of frame 1 in which original TD information was transmitted. It will be appreciated by one of ordinary skill in the art that the boundaries between TD and non-TD fields, and between other areas of the signal, can, if desired, be delineated by the terminal 105 by methods such as predetermined markers within the signal.

According to the present invention, the number of words required for transmission of TD information advantageously varies from frame to frame each FLEX™ cycle depending not only upon the TD pagers scheduled to wake during each frame, but also upon the number of messages actually received by the terminal 105 for transmission to TD pagers during each frame. Therefore, reduction in system capacity due to duplicate transmissions occurs only on an as-needed basis. For instance, relatively few words of a particular frame may be consumed by the transmission of duplicate TD messages when, in the original frame, only a small number of messages were required to be transmitted to TD pagers. At a different time, when message originators have provided a large number of TD messages to the terminal 105, a greater amount of space may be consumed by duplicate TD addresses, vectors, and messages.

In the prior art BCTD systems, conversely, a predetermined number of words in every frame is automatically reserved for the transmission of duplicate information. This predetermined number of words is fixed and cannot be dynamically changed to accommodate the transmission of either less or more duplicate information. Therefore, system capacity is always reduced by a predetermined amount, resulting in inefficient use of the radio channel.

Figure 11:
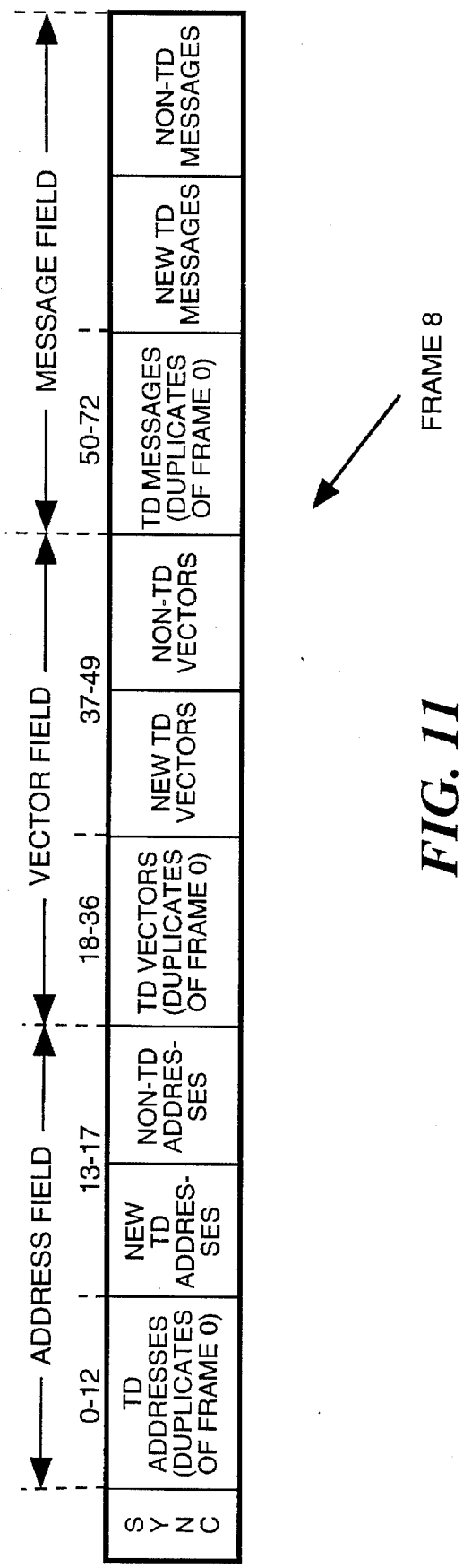
FIG. 11 is a signal diagram of the transmission of original and duplicate information in a single frame in accordance with the present invention.

As mentioned above, when home frames available for assignment to TD pagers are not restricted, it is possible that original TD information, duplicate TD information, and non-TD information will all be transmitted during a frame, as illustrated in the signal diagram of FIG. 11. FIG. 11, rather than FIG. 9, depicts frame 8 when both frame 0 and frame 8 are assigned as home frames for TD pagers. As shown, the duplicate TD addresses, vectors, and messages are positioned at words 0–12, 18–36, and 50–72, respectively, so that a TD pager can locate the duplicate TD information. In the frame 8 shown in FIG. 11, both new TD information and non-TD information can then be queued into the remaining portions of the frame. This new TD information would, with a system collapse of four, be duplicated in frame 16 (not shown) at locations determined by the locations in which it was originally transmitted in frame 8.

Although FIGS. 7–11 depict the grouping of TD and non-TD information, the TD and non-TD information could alternatively be sprinkled throughout each field (not shown). For instance, TD and non-TD information could be mixed within the address field, the vector field, and the message field as long as the locations of the TD information were duplicated in any duplicate frames so that a TD pager could locate the duplicate TD information.

Figure 12:
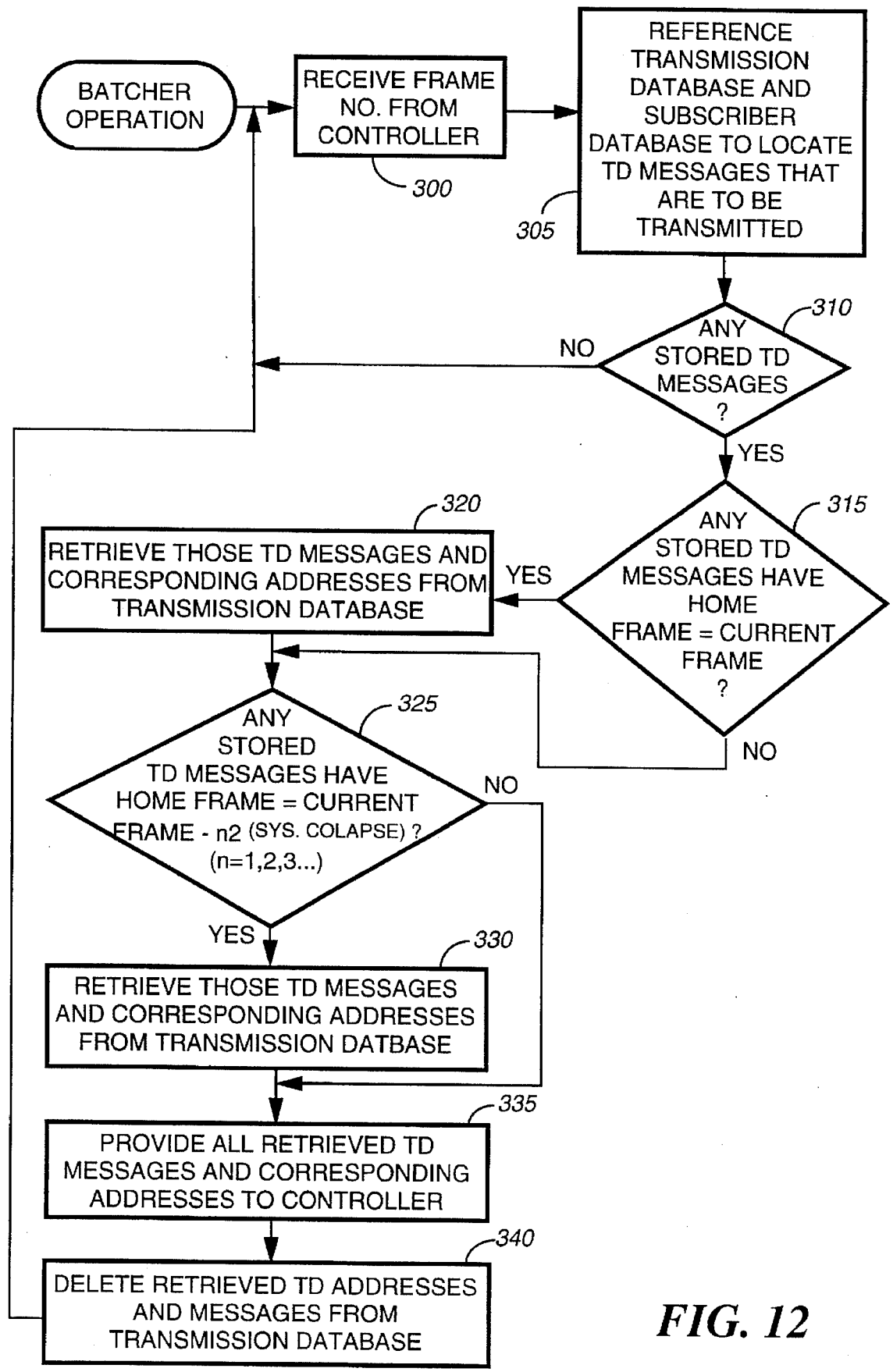
FIG. 12 is a flowchart of an operation of a batcher included in the terminal of FIG. 4 in accordance with the present invention.

FIG. 12 is a flowchart that depicts an operation of the terminal batcher 205 according to the present invention. At step 300, the batcher 205 receives a frame number from the controller 145 (FIG. 4) when the current frame is one in which TD pagers are scheduled to wake for reception of original transmissions. Then, at step 305, the batcher 205 references the transmission database 185 and the subscriber database 195 to locate TD messages that have been received and stored by the terminal 105. When, at step 310, TD messages are stored in the transmission database 185, the batcher 205 next determines, at step 315, whether any of the stored TD messages are intended for reception by TD pagers whose home frame is the current frame. TD messages and corresponding pager addresses for TD pagers whose home frame is the current frame are retrieved, at step 320, from the transmission database 185.

The batcher 205 further determines, at step 325, whether any other TD pagers that are to receive stored messages are scheduled to wake from battery saving in the current frame, i.e., whether the home frame of any TD pagers to receive messages is equal to the current frame minus $n2^{sc}$, where $n=1, 2, 3, \ldots$ When other recipient TD pagers are scheduled to wake in the current frame, those TD messages and addresses are retrieved, at step 330. Thereafter, all of the retrieved TD messages and addresses are provided, at step 335, to the controller 145 for queuing into address and message fields in the current frame. The retrieved TD messages and addresses are then, at step 340, deleted from the transmission database 185.

Figure 13:
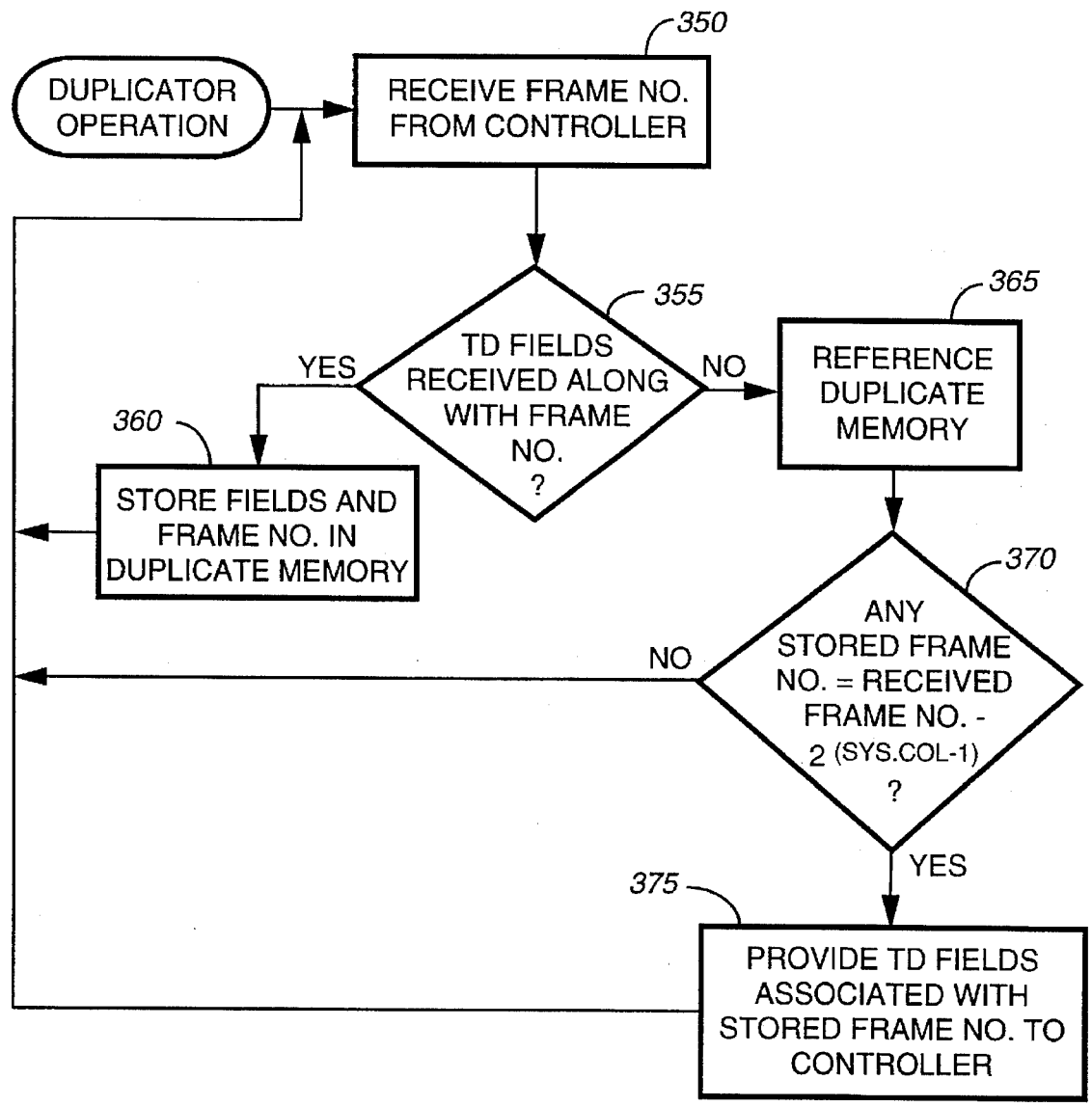
FIG. 13 is a flowchart of an operation of a duplicator included in the terminal of FIG. 4 in accordance with the present invention.

FIG. 13 is a flowchart of an operation of the terminal duplicator 210 (FIG. 4). According to the present invention, the duplicator 210 receives, at step 350, a frame number from the controller 145 when the current frame is one in which TD pagers are to wake for duplicate transmissions. When, at step 355, TD fields are received along with the frame number from the controller 145, the duplicator 210 stores, at step 360, the fields and the frame number in the duplicate memory 190 for later processing and transmission by the controller 145.

When at step 355, the frame number is received without accompanying TD address, vector, and message fields, the duplicator 210 references, at step 365, the duplicate memory 190 to determine whether duplicate information is to be transmitted during the current frame. More specifically, the duplicator 210 determines, at step 370, whether any stored frame number equals the received frame number minus $n2^{(sc-1)}$. When so, the duplicator 210, at step 375, provides the TD fields associated with that stored frame number to the controller 145 for transmission as duplicate information during the current frame.

Figure 14:
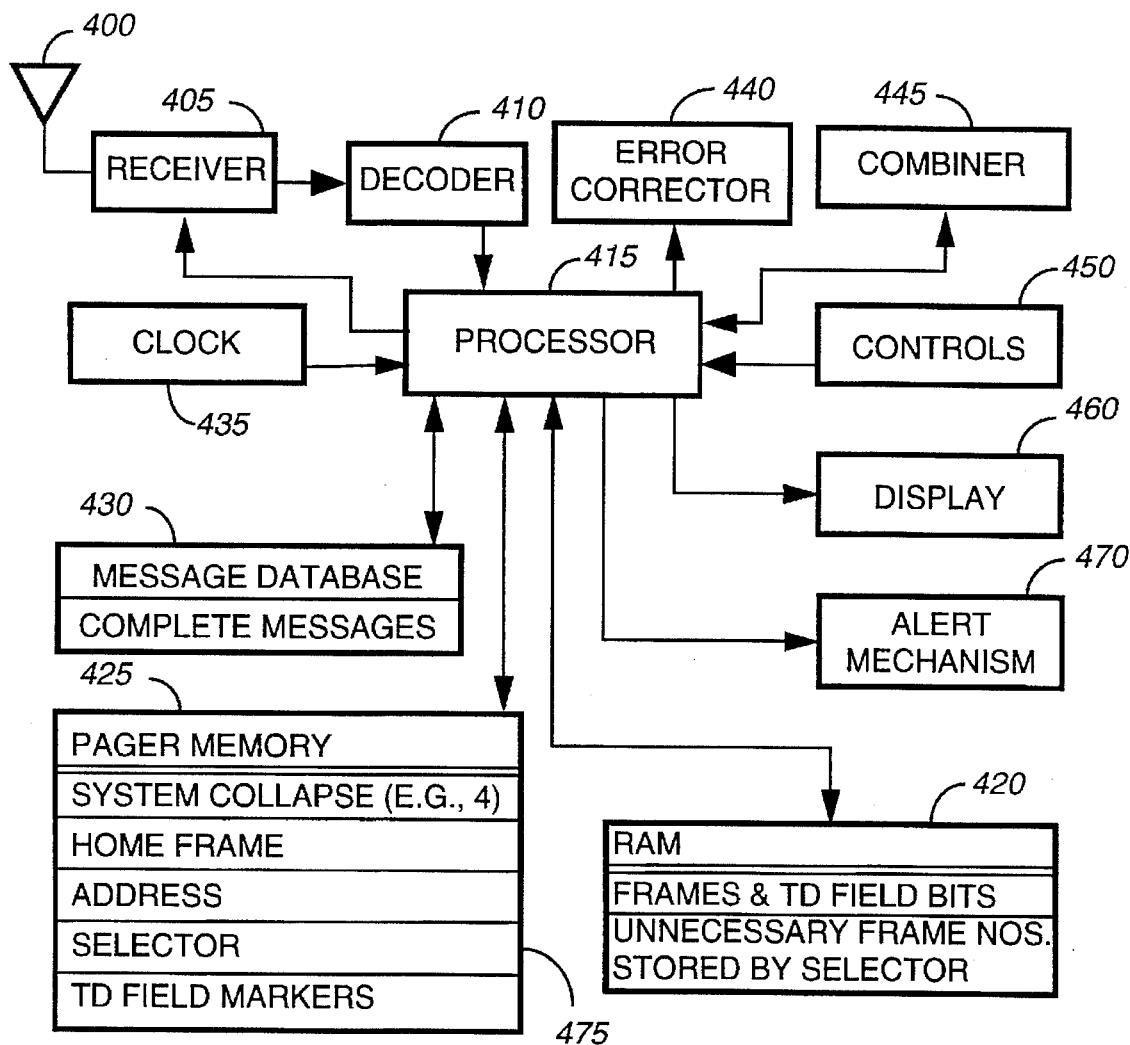
FIG. 14 is an electrical block diagram of a time diversity pager included in the communication system of FIG. 3 in accordance with the present invention.

Referring next to FIG. 14, an electrical block diagram of a TD message receiving device, such as a TD pager 110, is depicted. The pager 110 includes an antenna 400 for receiving a radio signal, a receiver 405 coupled thereto for demodulating the radio signal, and a decoder 410 for decoding the signal to recover data bits included therein. A processor 415 coupled to the decoder 410 processes the data bits for temporary storage in a memory such as a random access memory (RAM) 420. The processor 415 enables the receiver 405 to receive radio signals in accordance with conventional battery saving techniques by enabling the receiver 405 during frames in which the TD pager 110 may receive information and disabling the receiver 405 during other frames. The processor 415 conventionally determines the frame number by enabling the receiver 405, such as at power-up of the pager 110, to receive a "frame number indication" transmitted by the terminal 105. Thereafter, the processor 415 can determine when to wake and sleep by referencing a clock 435 and a system collapse value. In alternative embodiments of the present invention, the pager 110 may additionally or alternatively reference a pre-programmed pager collapse value.

The TD pager 110 also comprises a pager memory 425 for storing information such as the home frame assigned to the pager 110, the address of the pager 110, and the system collapse, which, for instance, can have an integer value of four. Additionally, the pager memory 425 preferably stores TD field markers such that the TD pager 110 can recognize delineations between TD and non-TD fields. A message database 430 is included in the TD pager 110 for storing complete messages that have been corrected by an error corrector 440 and that have, when necessary, been formed from bit combinations of both original and duplicate messages by a combiner 445 that employs conventional BCTD techniques.

Further included in the TD pager 110 are controls 450 for receiving user-initiated signals and proving the signals to the processor 415. A display 460 coupled to the processor 415 displays messages, and an alert mechanism 470 generates an alert, such as an audible tone, in response to activation by the processor 415. Additionally, a selector 475 processes bits received by the processor 415 and provides the processor 415 with complete messages formed from the received bits. The selector 475 also stores in the RAM 420 the frame numbers of frames for which the pager 110 need not awake from battery saving. These frames are referred to as "unnecessary" frames. The selector 475 can be, for instance, firmware that is stored in the pager memory 425. Alternatively, the selector 475 can be hardwired elements capable of performing equivalent operations.

Figure 15:
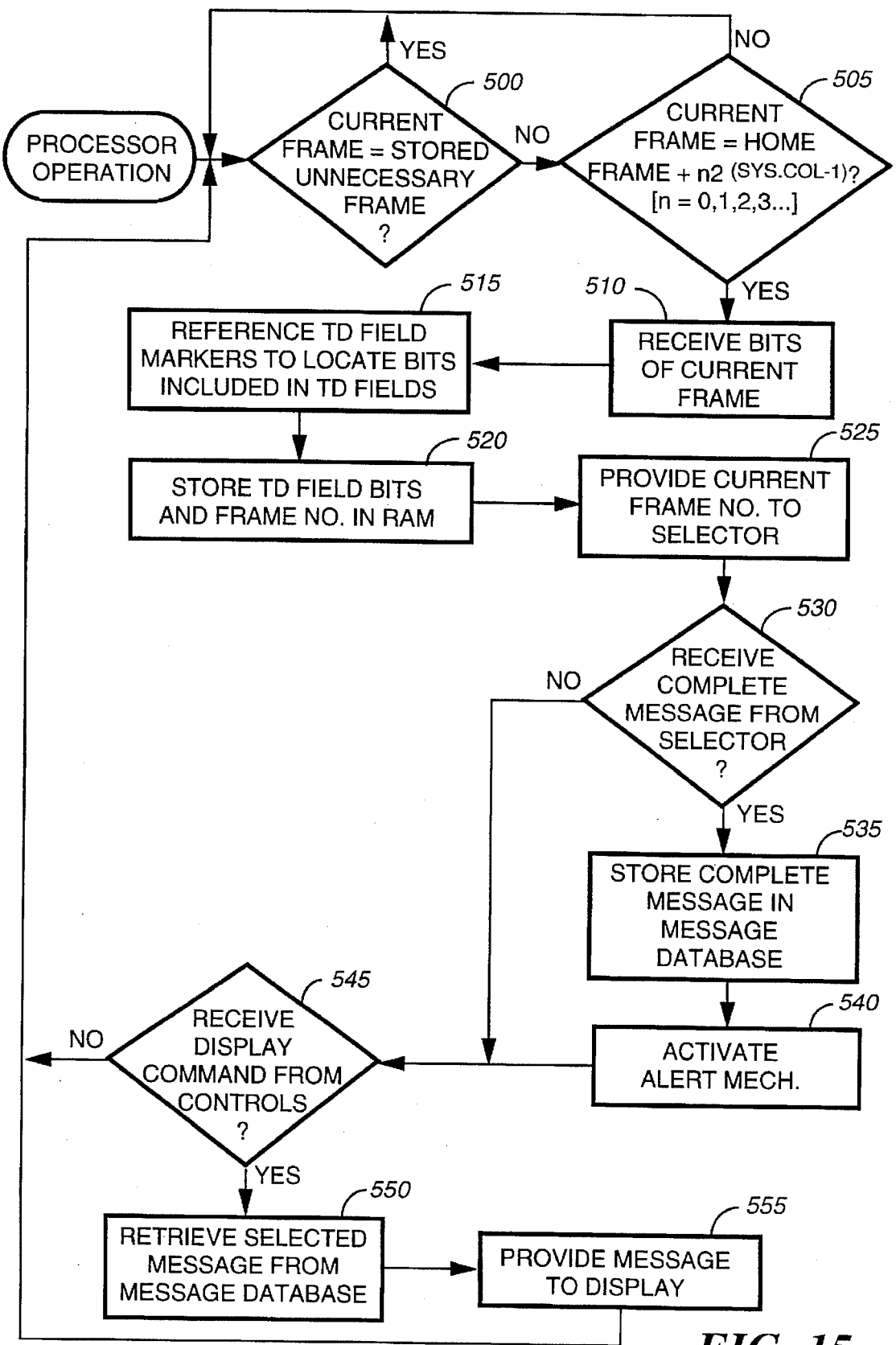
FIG. 15 is a flowchart of an operation of a processor included in the pager of FIG. 14 in accordance with the present invention.

FIG. 15 is a flowchart of an operation of the processor 415 according to the present invention. At step 500, the processor 415 determines whether the current frame has a number equivalent to an "unnecessary" frame number stored in the RAM 420. When so, the processor 415 does not enable the receiver 405. When the current frame is not an unnecessary frame, the processor 415 further determines, at step 505, whether the current frame is one during which the receiver 405 should be enabled for reception. The processor 415 enables the receiver 405 to receive, at step 510, transmitted bits when the current frame is equal to the home frame plus $n2^{(sc-1)}$, where n=0, 1, 2, . . . . Thereafter, at step 515, the processor 415 references the stored TD field markers to locate the incoming bits that are associated with TD address, vector, and message fields. The TD field bits, i.e., the bits included in the fields associated with TD pagers, and the current frame number are then stored, at step 520, in the RAM 420. Additionally, the processor 415 provides, at step 525, the current frame number to the selector 475.

When, at step 530, the processor 415 receives a complete message from the selector 475, the complete message is stored, at step 535, in the message database 430. In response to reception of a complete message, the processor 415 activates, at step 540, the alert mechanism 470 to announce reception of the message. When, at step 545, the processor 415 receives a display command from the controls 450, the selected message is retrieved, at step 550, from the message database 430 and provided, at step 555, to the display 460 for presentation to a user of the TD pager 110.

Figure 16:
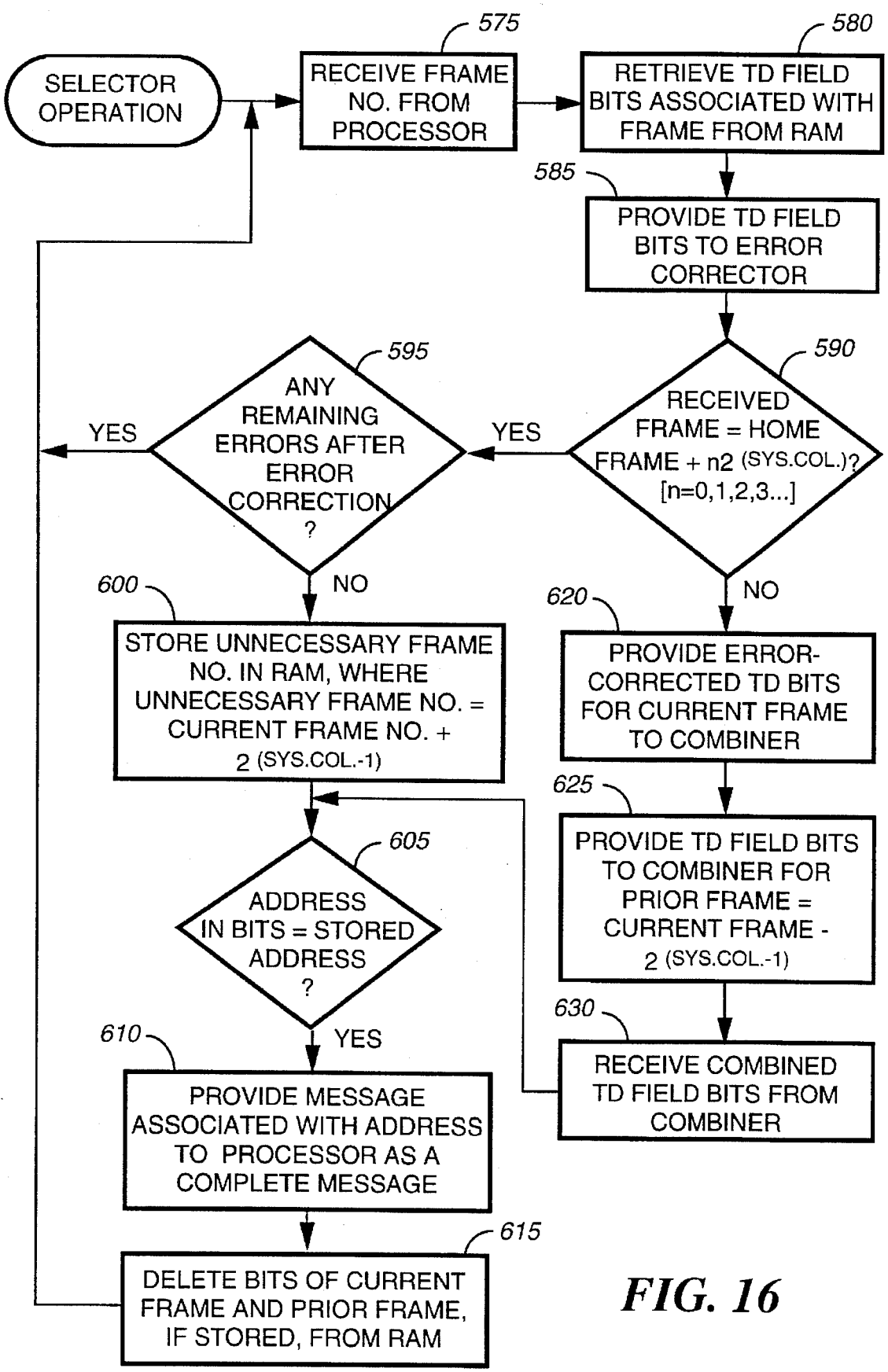
FIG. 16 is a flowchart depicting an operation of a selector included in the pager of FIG. 14 in accordance with the present invention.

Referring next to FIG. 16, a flowchart depicts an operation of the selector 475. According to the present invention, the selector 475, at step 575, receives a frame number from the processor 415. The selector 475 then retrieves, at step 580, the bits associated with the indicated frame from the RAM 420 and provides, at step 585, the bits to the error corrector 440 (FIG. 13). Next, the selector 475 determines whether the received frame number is associated with an original frame, i.e., one in which the pager 110 receives original transmissions, or a duplicate frame, i.e., one in which the pager 110 receives duplicate transmissions. When, at step 590, the received frame equals the home frame plus $n2^{sc}$, where n=0, 1, 2, . . . , the received frame number is indicative of an original frame, and, at step 595, the selector 475 determines in a conventional manner whether any errors remain in the bits after error correction.

When the bits are correct, i.e., when no errors remain, the selector 475 stores, at step 600, an unnecessary frame number in the RAM 420 to indicate that the TD pager 110 need not wake up from battery saving to receive information during the duplicate frame, i.e., the frame in which duplicate bits will be provided. The unnecessary frame number is given by the following equation:

$$\text{unnecessary frame no.} = \text{current frame no.} + 2^{(sc-1)}.$$

Thereafter, the selector 475 determines, at step 605, whether any bits included in the received bits are equivalent to the pager address. When so, the message intended for reception by the pager 110 is extracted from the received bits and provided to the processor 415 as a complete message. The selector 475 then, at step 615, deletes the bits associated with the current frame from the RAM 420.

When, at step 590, the received frame number is associated with a duplicate frame, the error-corrected TD bits associated with the current frame are provided, at step 620, to the combiner 445 (FIG. 13). The selector 475 also locates in the RAM 420 the TD field bits associated with a prior frame given by the following equation:

$$\text{prior frame} = \text{current frame} - 2^{(sc-1)}.$$

The bits associated with the prior frame are provided, at step 625, to the combiner 445. The combiner 445 preferably utilizes BCTD techniques to combine the original and duplicate bits provided thereto into a complete message. It will be understood, however, that other time diversity techniques could alternatively be utilized. For example, codewords, rather than bits, could be combined to form a message or the original and duplicate messages could simply be compared for retention of the more correct message.

After the selector 475 receives, at step 630, the combined bits from the combiner 445, the selector 475 then, at steps 605, 610, determines whether a message intended for reception by the pager 110 is included in the bits and provides any message to the processor 415. The selector 475 subsequently, at step 615, deletes the bits of the current frame and the prior frame from the RAM 420.

In this manner, the TD pager 110 can normally wake up during predetermined original and duplicate frames to receive original and duplicate transmissions. However, when an original transmission is received correctly, the pager 110 can further save battery life by sleeping through the next duplicate frame. Alternatively, in communication systems in which messages are generally received correctly during the first transmission, the TD pager 110 can normally wake up only during predetermined original frames. In such a system, the TD pager would then only wake up during a duplicate frame when, for example, a stored "necessary" frame, rather than an unnecessary frame, was stored by a selector element to indicate that the original transmission was received incorrectly.

It will be appreciated that, in alternate embodiments of the present invention, the transmission of TD markers, delineating the TD fields, would be unnecessary if the pager stored all bits of the original and duplicate frames rather than just the TD field bits.

The transmission of TD markers would also be unnecessary if the pager stored only corrupted bits of data. For example, when nine out of ten addresses in a frame are correct, the pager could just store the tenth corrupted address along with the vector and message fields, in case the corrupted address corresponded to that of the pager. This would significantly reduce memory requirements when, for instance, only the message, associated with an error-free address and vector, was corrupted, in which case only a relatively few corrupted bits need be stored by the pager.

Referring back to FIG. 7, both TD and non-TD addresses are included in a common address field in accordance with the preferred embodiment of the present invention. Additionally, TD and non-TD vectors are included in a common vector field, and TD and non-TD messages are included in a common message field. Therefore, the pager 110 need not be programmed to look for information in areas of the frame that are not normally utilized for providing a certain type of information.

Figure 1:
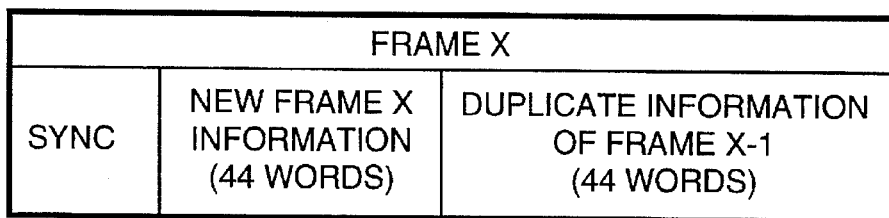
FIG. 1 is a signal diagram of a radio signal including a frame in which new message information is conventionally transmitted.
Figure 2:
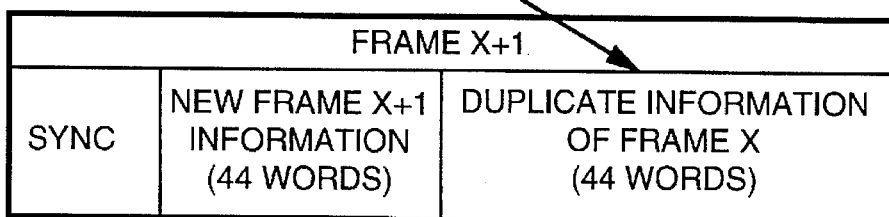
FIG. 2 is a signal diagram of a radio signal including another frame in which duplicate information, corresponding to the new information of FIG. 1, is conventionally transmitted.

Conversely, in prior art BCTD systems that utilize the FLEX™ protocol, TD receivers must be programmed to receive addresses, vectors, and messages in areas of the frame (FIG. 2) that are not normally utilized for the transmission of addresses, vectors, and messages. As a result, receivers that roam into the prior art system are unable to receive duplicate messages because the roamers have not been programmed to look for more than a single address, vector, and message field in each frame. In accordance with the present invention, on the other hand, system roamers can receive duplicate messages provided in the communication system 100 because duplicate addresses are provided in a common address field, duplicate vectors are provided in a common vector field, and duplicate messages are provided in a common message field. This can be done without any programming exclusively for the communication system 100 because, when the pager collapse of a roaming pager is greater than the system collapse, the roaming pager will use the system collapse, as mentioned above.

According to an alternate embodiment o#the present invention, acknowledge back capability could be utilized in a communication system according to the present invention, in which case a TD pager receiving an error-free original transmission would acknowledge reception of the message to the terminal. In such a system, duplicate messages for TD pagers that have acknowledged would not be necessary, and additional capacity within duplicate frames would be freed for transmission of more non-TD information or new TD information. For instance, if half of the TD pagers receiving original information transmitted acknowledgments to the terminal, the terminal would only need to transmit duplicate information to the half of the TD pagers that did not send acknowledgments. The areas of the duplicate frame which would otherwise be utilized for transmission of duplicate information to the acknowledging pagers could then instead be queued with other information, thereby more efficiently utilizing the radio channel.

Figure 17:
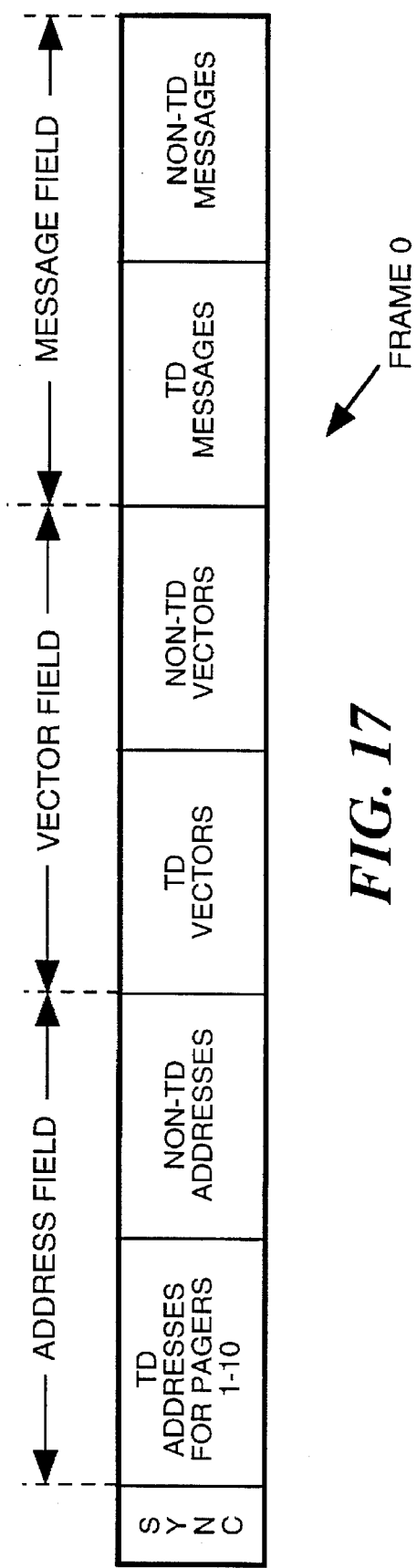
FIGS. 17 and 18 are signal diagrams depicting the transmissions of original and duplicate information in an acknowledge-back communication system in accordance with the present invention.
Figure 18:
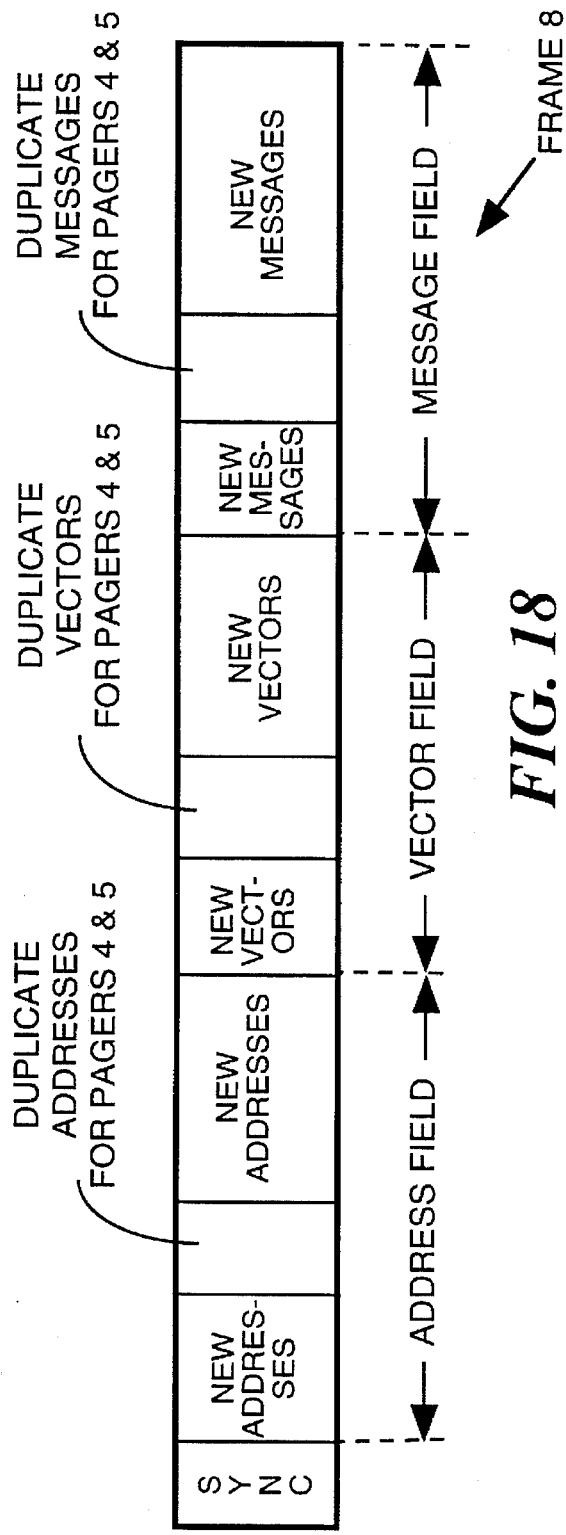

Referring to FIGS. 17 and 18, signal diagrams indicate the queuing of information into original and duplicate frames in an acknowledge-back diversity system. FIG. 17 shows the original transmission of TD and non-TD addresses, vectors, and messages in frame 0. For illustration purposes, TD information is transmitted to pagers 1–10. FIG. 18 shows the duplicate transmission of information, only as necessary, in frame 8. In FIG. 18, all but pagers 4 and 5 have acknowledged reception of the original TD information. Therefore, only duplicate information for pagers 4 and 5 need be transmitted. The duplicate information should, however, be transmitted in locations of frame 8 associated with the respective locations of pager 4 and 5 information as transmitted in frame 0. Because the duplicate information for pagers 1–3 and pagers 6–10 does not need to be transmitted, those portions of frame 8 associated therewith are available for transmission of new information.

In summary, the communication system as described above includes a terminal for transmitting messages to time diversity pagers at least two times. The terminal gathers received time diversity information and queues the information for each frame into address, vector, and message fields that also include information intended for reception by non-time diversity pagers. According to the present invention, the amount of time diversity information included in each frame varies according to the number of messages waiting to be transmitted and the number of time diversity pagers scheduled to receive information in that frame. Therefore, the system capacity available for transmission of original messages is only reduced as necessary. Furthermore, because both the time diversity information and the non-time diversity information are transmitted in common FLEX™ fields, roaming pagers are able to locate the address, vector, and message fields for duplicate information.

Another advantage of the communication system according to the present invention is that the frames are not restricted to a predetermined number of words for original and duplicate information. In other words, the number of words for original and duplicate information varies from frame to frame. Lengthy messages are therefore not automatically prohibited from being transmitted in a frame. Subscribers in the communication system according to the present invention can receive lengthy messages without the delays or fragmentation present in the prior art BCTD system.

Furthermore, according to the present invention, duplicate messages are preferably transmitted within the system collapse time. Therefore, in a system where messages are sequentially numbered, duplicate messages having a particular message number are received by the pager before the next-numbered message is transmitted by the terminal. Situations are accordingly eliminated in which a pager receives a next-numbered message before a complete prior message has been formed and concludes that the prior message has been missed.

It will be appreciated by now that there has been provided a method and apparatus for sending duplicate transmissions without decreasing system capacity by a predetermined, fixed amount and without significantly decreasing battery life. The method and apparatus further provides for reception of duplicate transmissions by roaming pagers. Additionally, in a numbered message scheme, the pager will not erroneously conclude that a message has been missed, and lengthy messages can be received without delay.

What is claimed is:

1. A method for providing duplicate messages in a radio communication system including a message transmission device for sending a radio signal including the duplicate messages and receivers for receiving the radio signal, the receivers comprising time diversity receivers for receiving the duplicate messages and non-time diversity receivers, the method comprising the steps of:

receiving first information for transmission to at least one time diversity receiver; and batching a first frame of data for transmission in the radio signal, wherein the first information for transmission to the at least one time diversity receiver is queued into a portion of the first frame having a non-predetermined size that varies according to an amount of the first information to be transmitted to the at least one time diversity receiver during the first frame, and wherein portions of the first frame remaining after queuing of the first information are queued with second information for transmission to at least one non-time diversity receiver, wherein at least a portion of the first information is duplicated for transmission in a subsequent frame of data in which the second information is not duplicated.

2. The method of claim 1, further comprising the step of transmitting the first frame.

3. A method for providing duplicate messages in a radio communication system including a message transmission device for sending a radio signal including the duplicate messages and receivers for receiving the radio signal, the receivers comprising time diversity receivers for receiving the duplicate messages and non-time diversity receivers, the method comprising the steps of:

receiving first information for transmission to at least one time diversity receiver;

batching a first frame of data for transmission in the radio signal, wherein the first information for transmission to the at least one time diversity receiver is queued into a portion of the first frame having a non-predetermined size that varies according to an amount of the first information to be transmitted to the at least one time diversity receiver during the first frame, and wherein portions of the first frame remaining after queuing of the first information are queued with second information for transmission to at least one non-time diversity, receiver;

batching a second frame of data for transmission in the radio signal, wherein third information for transmission to the at least one time diversity receiver is located in a portion of the second frame, wherein the portion of the second frame is equivalent in size to the portion of the first frame in which the first information was transmitted, and wherein portions of the second frame remaining after location of the third information are queued with fourth information for transmission to at least one non-time diversity receiver; and transmitting the second frame.

4. The method of claim 3, wherein the third information is a duplicate of the first information, and wherein the method further comprises, coincident with the batching step, the step of:

positioning the third information in locations of the second frame that are equivalent to locations in which the first information was queued in the first frame.

5. The method of claim 3, wherein the third information is a subset of the first information, and wherein the method further comprises the steps of:

receiving, prior to batching the second frame, an acknowledgment of reception from a time diversity receiver included in the at least one time diversity receiver;

determining which data included in the first information is associated with the time diversity receiver that acknowledged;

generating the third information from the first information by deleting the data therefrom; and positioning the third information in locations of the second frame that are equivalent to locations in which the subset of the first information was queued in the first frame.

6. The method of claim 3, further comprising the steps of:

receiving fifth information for transmission to at least one time diversity receiver; and batching a third frame of data for transmission in the radio signal, wherein:

the fifth information for transmission to the at least one time diversity receiver is queued into a portion of the third frame having a non-predetermined size that varies according to an amount of the fifth information to be transmitted to the at least one time diversity receiver during the third frame;

the non-predetermined size of the portion of the third frame in which the fifth information is queued is unrelated to the non-predetermined size of the portion of the first frame in which the first information is queued; and portions of the third frame remaining after queuing of the fourth information are queued with sixth information for transmission to at least one non-time diversity receiver.

7. The method of claim 6, wherein the first, second, fourth, fifth and sixth information comprise original information for transmission to some of the receivers, and wherein the method further comprises the steps of:

a recipient time diversity receiver receiving the first and third information transmitted in the first and second frames; and processing the first and third information to derive therefrom a complete message.

8. The method of claim 7, wherein the processing step comprises the steps of:

comparing first and second messages included the first and third information; and selecting for retention one of the first and second messages that contains fewer errors.

9. The method of claim 7, wherein the processing step comprises the steps of:

comparing words included in the first and third information; and combining the words to form a correct message.

10. The method of claim 7, wherein the processing step comprises the steps of:

comparing bits included in the first and third information; and combining the bits to form a correct message.

11. A message transmission device for transmitting a radio signal, the message transmission device comprising:

receiving means for receiving first information for transmission to at least one time diversity receiver; and first batching means for batching a first frame of data for transmission in the radio signal, wherein the first information for transmission to the at least one time diversity receiver is queued into a portion of the first frame having a non-predetermined size that varies according to an amount of the first information to be transmitted to the at least one time diversity receiver during the first frame, and wherein portions of the first frame remaining after queuing of the first information are queued with second information for transmission to at least one non-time diversity receiver, wherein at least a portion of the first information is duplicated for transmission in a subsequent frame of data in which the second information is not duplicated.

12. The message transmission device of claim 11, wherein the radio signal comprises a plurality of frames, the frames including an address field for identifying receivers to which messages are being transmitted, a message field in which the messages are queued, and a vector field including vectors for associating an address in the address field to a message in the message field.

13. A message transmission device for transmitting a radio signal, the message transmission device comprising:

receiving means for receiving first information for transmission to at least one time diversity receiver; and first batching means for batching a first frame of data for transmission in the radio signal, wherein the first information for transmission to the at least one time diversity receiver is queued into a portion of the first frame having a non-predetermined size that varies according to an amount of the first information to be transmitted to the at least one time diversity receiver during the first frame, and wherein portions of the first frame remaining after queuing of the first information are queued with second information for transmission to at least one non-time diversity receiver, wherein the radio signal comprises a plurality of frames, the frames including an address field for identifying receivers to which messages are being transmitted, a message field in which the messages are queued, and a vector field including vectors for associating an address in the address field to a message in the message field, wherein the address field comprises a first region including addresses of time diversity receivers and a second region including addresses of non-time diversity receivers, and wherein the first and second regions are non-predetermined in size and vary per frame according to the data being transmitted to the time diversity receivers in that frame.

14. The message transmission device of claim 13, wherein the message field comprises a first region including messages for time diversity receivers and a second region including messages for non-time diversity receivers, wherein the first and second regions are non-predetermined in size and vary per frame according to the number and sizes of the messages being transmitted to the time diversity receivers in that frame.

15. A message transmission device for transmitting a radio signal, the message transmission device comprising:

receiving means for receiving first information for transmission to at least one time diversity receiver;

first batching means for batching a first frame of data for transmission in the radio signal, wherein the first information for transmission to the at least one time diversity receiver is queued into a portion of the first frame having a non-predetermined size that varies according to an amount of the first information to be transmitted to the at least one time diversity receiver during the first frame, and wherein portions of the first frame remaining after queuing of the first information are queued with second information for transmission to at least one non-time diversity receiver; and second batching means for batching a second frame of data for transmission in the radio signal, wherein third information that is a duplicate of the first information is located in a portion of the second frame, wherein the portion of the second frame is equivalent in size to the portion of the first frame in which the first information was transmitted, and wherein portions of the second frame remaining after location of the third information are queued with fourth information for transmission to at least one non-time diversity receiver.

16. A message transmission device for transmitting a radio signal, the message transmission device comprising:

receiving means for receiving first information for transmission to at least one time diversity receiver;

first batching means for batching a first frame of data for transmission in the radio signal, wherein the first information for transmission to the at least one time diversity receiver is queued into a portion of the first frame having a non-predetermined size that varies according to an amount of the first information to be transmitted to the at least one time diversity receiver during the first frame, and wherein portions of the first frame remaining after queuing of the first information are queued with second information for transmission to at least one non-time diversity receiver; and second batching means for batching a second frame of data for transmission in the radio signal, wherein third information that is a duplicate of a subset of the first information is located in a portion of the second frame, wherein the portion of the second frame is equivalent in size to a portion of the first frame in which the subset of the first information was transmitted, wherein portions of the second frame remaining after location of the third information are queued with fourth information for transmission to at least one non-time diversity receiver, and wherein the third information is associated with at least one device included in the at least one time diversity receiver that did not acknowledge reception.

17. The message transmission device of claim 15, further comprising:

a memory for storing a system collapse value indicative of a time period in which a particular number of frames is transmitted; and a transmitter for transmitting the first and second frames and the system collapse value.

18. The message transmission device of claim 17, wherein the second frame is transmitted at a predetermined time after transmission of the first frame, the predetermined time equal to one-half of the time period indicated by the system collapse value.

19. The message transmission device of claim 17, wherein the first and second batching means comprise:

a batcher for gathering the first, second, and fourth information, wherein the first, second, and fourth information comprise original information for transmission to some receivers;

a controller coupled to the batcher for queuing the first information and the second information into the first frame, for locating the third information in the second frame according to a location of the first information in the first frame, and for queuing the fourth information into the second frame; and a duplicator coupled to the controller for providing the third information to the controller during preparation of the second frame.

20. The message transmission device of claim 19, further comprising:

a subscriber database for storing a listing of receivers that receive messages from the message transmission device;

a system memory for storing the system collapse value and, as firmware, the batcher and duplicator; and a transmission database for storing messages for the receivers.

21. A communication system for providing duplicate messages, the communication system comprising:

a plurality of receivers for receiving a radio signal, the plurality of receivers comprising time diversity and non-time diversity receivers; and a message transmission device for transmitting the radio signal including a first frame of data, the first frame comprising first portions in which first information for reception by at least one time diversity receiver is queued and second portions which are remaining after queuing of the first information and which are queued with second information for reception by at least one non-time diversity receiver, wherein the first portions are of a non-predetermined size that varies according to an amount of the first information, wherein at least a portion of the first information is duplicated for transmission in a subsequent frame of data in which the second information is not duplicated.

22. A communication system for providing duplicate messages, the communication system comprising:

a plurality of receivers for receiving a radio signal, the plurality of receivers comprising time diversity and non-time diversity receivers; and a message transmission device for transmitting the radio signal including a first frame of data, the first frame comprising first portions in which first information for reception by at least one time diversity receiver is queued and second portions which are remaining after queuing of the first information and which are queued with second information for reception by at least one non-time diversity receiver, wherein the first portions are of a non-predetermined size that varies according to an amount of the first information, wherein:
the first and second information comprise original information; and
the message transmission device comprises batching means for batching a second frame of data for transmission in the radio signal, wherein third information that is a duplicate of the first information is located in first portions of the second frame, wherein the first portions of the second frame are equivalent in size to the first portions of the first frame, and wherein second portions of the second frame remaining after location of the third information are queued with fourth information for transmission to at least one non-time diversity receiver.

23. The communication system of claim 22, wherein the message transmission device further comprises:

a memory for storing a system collapse value indicative of a time period in which a particular number of frames is transmitted; and a transmitter for transmitting the first and second frames and the system collapse value.

24. The communication system of claim 23, wherein the second frame is transmitted at a predetermined time after transmission of the first frame, the predetermined time equal to one-half of the time period indicated by the system collapse value.

25. The communication system of claim 24, wherein the time diversity receivers comprise receiving means for receiving frames every on-half of the time period indicated by the system collapse value.

26. The communication system of claim 22, wherein the time diversity receivers comprise:

receiving means for receiving the first and third information transmitted, respectively, in the first and second frames; and processing means coupled to the receiving means for processing the first and third information to derive therefrom a complete message.

27. The communication system of claim 26, wherein the processing means comprises a combiner for comparing bits included in the first and third information and combining the bits to form a correct message.

* * * * *